United States Patent
Muhl et al.

(10) Patent No.: US 7,380,305 B2
(45) Date of Patent: Jun. 3, 2008

(54) LOADING DOCK SYSTEM WITH BIODEGRADABLE FLUID

(75) Inventors: Tim Muhl, Slinger, WI (US); Kyle E. Nelson, Cedarburg, WI (US); Reinhard E. Sander, Wauwatosa, WI (US); Matthew Tourdot, Whitewater, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 239 days.

(21) Appl. No.: 11/079,437

(22) Filed: Mar. 14, 2005

(65) Prior Publication Data

US 2006/0204350 A1    Sep. 14, 2006

(51) Int. Cl.
*E01D 1/00* (2006.01)
(52) U.S. Cl. ........................................ 14/71.7
(58) Field of Classification Search ........... 14/71.1, 14/71.7; 414/401
See application file for complete search history.

(56) References Cited

U.S. PATENT DOCUMENTS

| | | | | |
|---|---|---|---|---|
| 4,368,126 A | * | 1/1983 | Audeh et al. | 210/663 |
| 4,830,563 A | * | 5/1989 | Yeakle | 414/401 |
| 4,861,217 A | * | 8/1989 | Erlandsson | 414/401 |
| 4,938,648 A | * | 7/1990 | Horan et al. | 414/401 |
| 5,203,663 A | * | 4/1993 | Ruppe | 414/401 |
| 5,297,921 A | * | 3/1994 | Springer et al. | 414/401 |
| 5,505,575 A | * | 4/1996 | Alexander | 414/401 |
| 5,890,835 A | * | 4/1999 | Basta et al. | 405/3 |
| 6,488,464 B1 | * | 12/2002 | Kish | 414/401 |
| 6,837,166 B1 | * | 1/2005 | Roodenburg et al. | 104/53 |
| 6,896,469 B2 | * | 5/2005 | Alexander | 414/401 |
| 7,165,486 B2 | * | 1/2007 | Alexander et al. | 91/530 |

OTHER PUBLICATIONS

Benz Oil, *BIO-HYD Biodegradable Lubricants*, Material Safety Data Sheet, 3 Pages (Apr. 4, 2003).
Declaration of Greg D. Proffitt, P.E., 2 Pages.

* cited by examiner

*Primary Examiner*—Gary S Hartmann
(74) *Attorney, Agent, or Firm*—Hanley, Flight & Zimmerman, LLC

(57) ABSTRACT

A hydraulic system for operating dock levelers, vehicle restraints, and other types of loading dock equipment includes one or more features that prolong the life of the hydraulic fluid. A hydraulic reservoir with a desiccant filled breather cap or a hermetically sealed pliable reservoir minimizes the hydraulic fluid's exposure to condensation and atmospheric moisture. The system can be used for prolonging the life of both biodegradable and- non-biodegradable hydraulic fluids. In some embodiments, the system includes an acceptably biodegradable fluid having a combination of properties that makes the fluid particularly suitable for loading dock equipment.

9 Claims, 2 Drawing Sheets

LOADING DOCK SYSTEM WITH BIODEGRADABLE FLUID

FIELD OF THE DISCLOSURE

The subject disclosure generally pertains to hydraulically actuated loading dock equipment such as dock levelers and vehicle restraints and, more specifically, to operating such equipment with a biodegradable hydraulic fluid.

BACKGROUND

A typical truck loading dock of a building includes an exterior doorway with an elevated platform for loading and unloading vehicles such as trucks and trailers. Many loading docks have a dock leveler to compensate for a height difference that may exist between the loading dock platform and an adjacent bed of a truck or trailer. A typical dock leveler includes a deck that is vertically movable for adjusting the height of its front edge to an elevation that generally matches the height of the rear edge of the truck bed. A pivotal or otherwise movable lip extending from the front edge of the deck can be placed upon the truck bed to form a bridge between the deck and the bed. This allows personnel and material handling equipment, such as a forklift truck, to readily move on and off the vehicle during loading and unloading operations.

To help prevent the truck from accidentally pulling away from the elevated platform of the dock while the truck is being loaded or unloaded of its cargo, the loading dock may include a vehicle restraint. A vehicle restraint usually includes a hook or some other type of barrier that can move to selectively engage and release some part of the truck or trailer, such as its wheel or the rear impact guard (ICC bar).

Many dock levelers and vehicle restraints are actuated by a hydraulic system comprising various configurations of cylinders, rotary actuators, pumps, valves and other hydraulic components. Although hydraulic systems are excellent means for actuation, the hydraulic fluid used in such systems is usually petroleum based and not biodegradable, thus the fluid may create an environmental problem. If a non-biodegradable fluid, for instance, were to leak out onto the dock floor, the fluid may drain into a storm-sewer meant primarily for handling relatively clean runoff. But even if the fluid does not accidentally escape, hydraulic fluid should be changed periodically to prolong the life of the equipment, and procedures for properly disposing of non-biodegradable fluid can be expensive and/or difficult to expedite.

Although food-grade biodegradable fluids are available for food-handling equipment, such fluids are inadequate for use in loading dock equipment, which operate under a unique set of conditions. First, loading dock equipment is typically outdoors so it may need to operate over a very broad range of temperatures from below −40° F. to over 100° F., which can cause an unacceptable variation in the fluid's viscosity. Common food-grade biodegradable fluids may gel or solidify near 0° F., which is unacceptable for many loading dock applications. At low temperatures, excessive viscosity can slow the operation of a hydraulic system and inhibit the pump's ability to pump the fluid. At higher temperatures, insufficient viscosity can allow surface wear to occur between moving parts, i.e. pump gears, piston seals, etc.

Second, dock levelers and vehicle restraints have such a low duty cycle that in some cases they may only operate a few times a day with an operating duration of just 30 seconds per cycle. The short cycle times and extended periods of inactivity make it difficult for the operation of the pump itself to keep the hydraulic fluid sufficiently warm for proper viscosity.

Third, since hydraulic systems of loading docks are usually exposed to outdoor air, they are particularly subject to moisture contamination. Hydraulic systems typically have a tank or oil reservoir for holding a supply of hydraulic fluid from which the pump draws the fluid. As hydraulic cylinders extend or retract to move the dock leveler or vehicle restraint, oil leaves or returns to the tank, which causes the fluid level in the tank to rise and fall. The varying fluid level forces ambient air to alternately enter and leave the tank through what is known as a breather cap. Outside air entering the tank can introduce moisture to the hydraulic fluid. If the outside air temperature cools the tank, warmer air inside the tank can release moisture that condenses on the inner surface of the tank and eventually drains into the hydraulic fluid. Moisture not only promotes the degradation of biodegradable fluids, but it also dilutes and shortens the useful life of non-biodegradable fluids as well.

Consequently a need exists for a loading dock system that can operate with a biodegradable hydraulic fluid.

DETAILED DESCRIPTION

Figure 1:
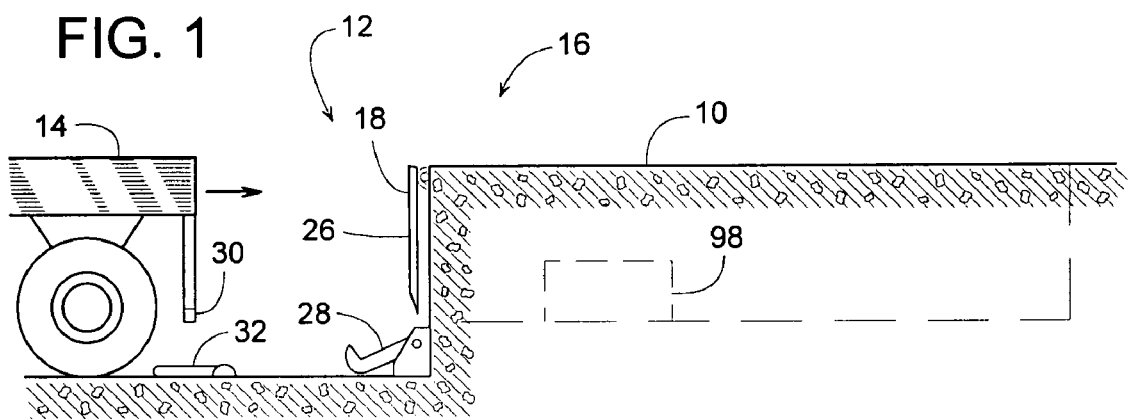
FIG. 1 is a side view of vehicle backing into a loading dock that includes a novel loading dock system.
Figure 2:
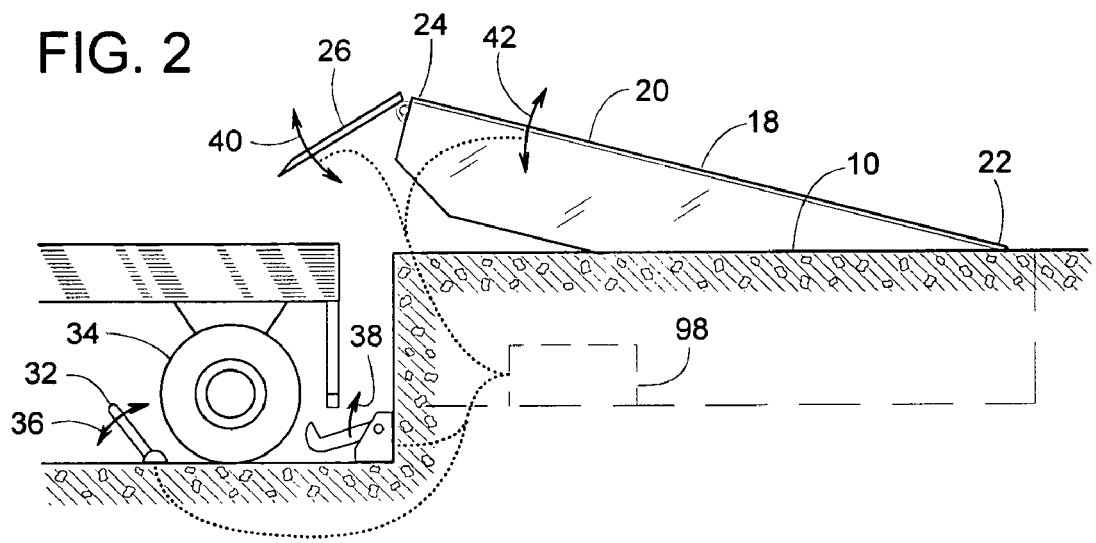
FIG. 2 is a side view similar to FIG. 1 but showing the loading dock system moving from a stored position to an operative position.
Figure 3:
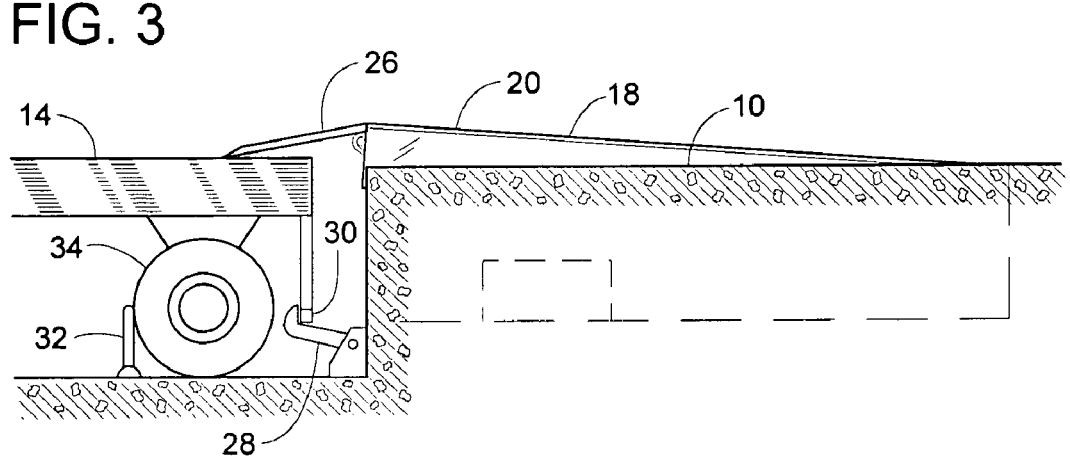
FIG. 3 is a side view similar to FIGS. 1 and 2 but showing the loading dock system in an operative position.

Referring to FIGS. 1-3, in order to compensate for a height differential that may exist between a platform 10 of a loading dock 12 and the bed of a vehicle 14 (e.g., a truck, trailer, etc.), a loading dock system 16 may comprise a dock leveler 18 that includes a ramp or deck 20 that can pivot about its back edge 22 (or translate vertically) to adjust the height of its front edge 24. To bridge the gap between the deck's front edge 24 and the rear edge of vehicle 14, a pivotal or otherwise moveable lip 26 can extend from the deck's front edge 24 to reach out over the top of the vehicle's truck bed. In some embodiments, lip 26 can pivot between a stored, pendant position (FIG. 1) and an extended operative position (FIG. 3)

To help prevent vehicle 14 from accidentally pulling away from platform 10 of dock 12 while vehicle 14 is being loaded or unloaded of its cargo, dock 12 may be provided with a vehicle restraint, such as a vehicle restraint 28 adapted to engage an ICC bar 30 of vehicle 14 or a vehicle restraint 32 adapted to engage a wheel 34 of vehicle 14. Deck 20, lip 26, and vehicle restraints 28 and 32 can each be referred to as a "dock member," which is any structure that is movable to selectively engage and disengage a vehicle at a loading dock. Although there are countless types of dock members, some examples are disclosed in U.S. Pat. Nos. 6,773,221; 6,505,713; 6,311,352; 6,085,375; 6,065,172;

5,323,503; 5,297,921; 4,920,598; 4,744,121; and 4,634,334 all of which are specifically incorporated by reference herein.

FIGS. 1-3 show two different types of vehicle restraints for illustrative purposes; however, normally a loading dock would have a need for just one vehicle restraint. Loading docks having just one vehicle restraint and no dock leveler, loading docks with a dock leveler but with no vehicle restraint, and dock levelers with horizontally extendable decks and/or fixed lips may be used instead of or in addition to the examples disclosed herein.

In operation, truck 14 backs into the loading dock, adjacent to platform 10, as shown in FIG. 1. At this point, deck 20 is at its stored, cross-traffic position where an upper surface of the deck is generally flush with platform 10. Lip 26 is shown at its pendant position, and vehicle restraints 28 and 32 are shown disengaged from vehicle 14.

Next, referring to FIG. 2, vehicle restraints 28 and 32 move to engage and restrain vehicle 14, and deck 20 rises and lip 26 swings out to extend out over the top of the truck bed. Arrows 36, 38, 40 and 42 schematically represent hydraulic actuation of the various dock members.

Finally, in FIG. 3, deck 20 descends to place the extended lip 26 upon the bed of truck 14. Vehicle restraints 28 and 32 are each now shown in their vehicle-engaging position and vehicle 14 is ready to be loaded or unloaded of its cargo.

Figure 4:
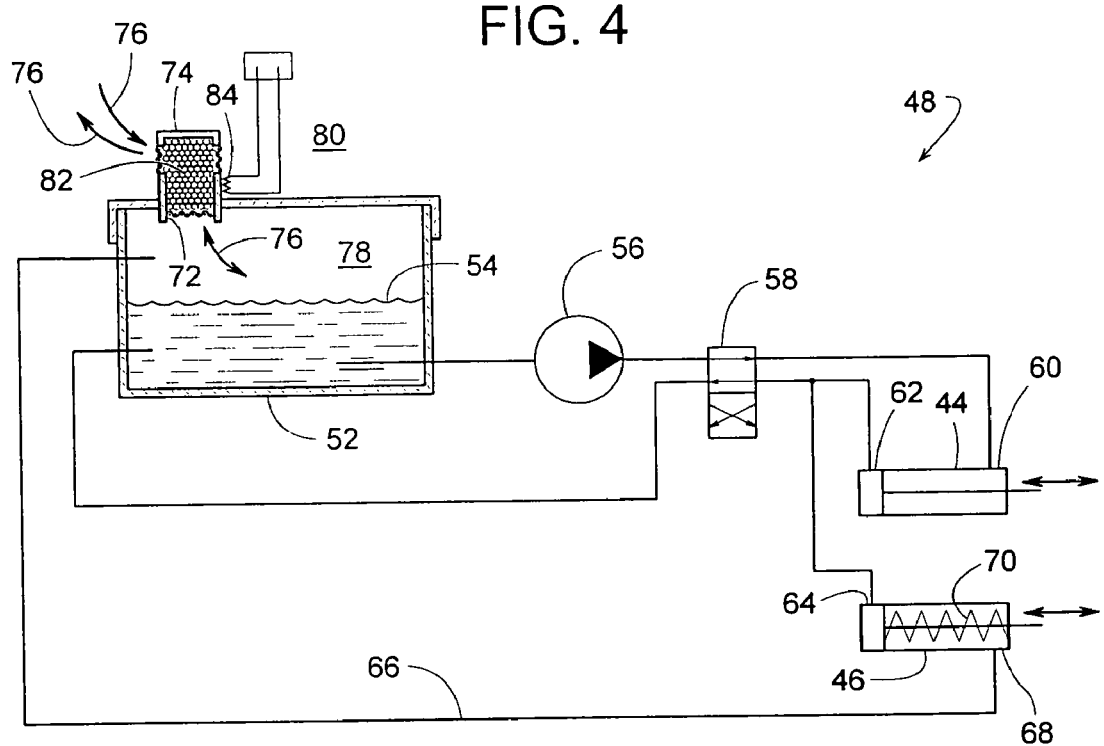
FIG. 4 is a schematic diagram of a hydraulic system that could be used in the loading dock system of FIGS. 1-3.
Figure 5:
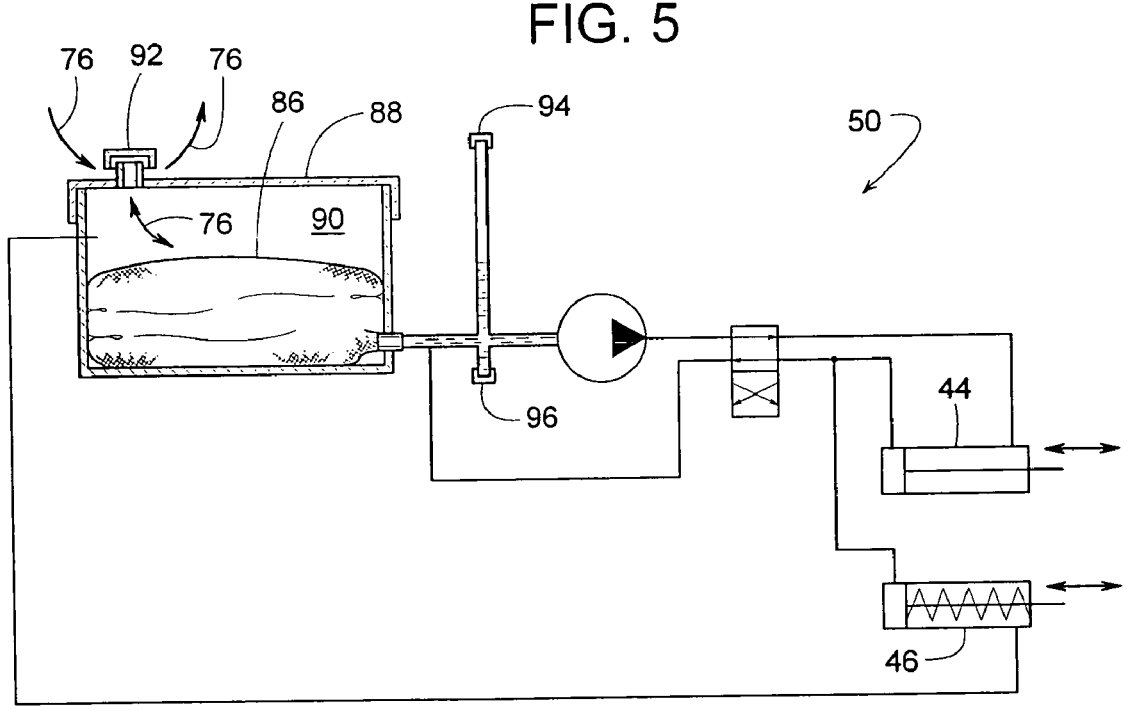
FIG. 5 is a schematic diagram of an alternate hydraulic system that could be used in the loading dock system of FIGS. 1-3.

The movement of a dock member (e.g., deck 20, lip 26, or vehicle restraints 28 or 32) can be driven by a hydraulic cylinder 44 or 46 of FIGS. 4 and 5, or the movement can be driven by some other hydraulic actuator well known to those of ordinary skill in the art. Although in some embodiments a dock member may be driven hydraulically back and forth, in other embodiments a dock member may be driven in one direction hydraulically and driven in an opposite direction by weight, spring force, or some other force.

Although an actual hydraulic system for driving a dock member may vary widely, hydraulic systems 48 and 50 of FIGS. 4 and 5 illustrate the basic manner in which such a system can operate. System 48, for example, comprises a reservoir 52 containing a hydraulic fluid 54; a pump 56 for providing pressurized hydraulic fluid to one or more actuators, such as cylinders 44 and 46; and a valve 58 for determining an actuator's direction of actuation, which in turn determines a dock member's direction of movement. In this example, valve 58 is a conventional two-position, four-way valve that could be electrically, manually, and/or pilot-operated. For illustrative purposes, cylinder 44 is shown as a double-acting cylinder, and cylinder 46 is a single-acting, spring-return cylinder.

With valve 58 in the position shown in FIG. 4, valve 58 connects a rod end 60 of cylinder 44 to the discharge of pump 56 and connects a cylinder end 62 of cylinder 44 to reservoir 52, whereby cylinder 44 retracts. Valve 58 also connects a cylinder end 64 of cylinder 46 to reservoir 52, and a line 66 connects a rod end 68 of cylinder 46 to reservoir 52, whereby an internal compression spring 70 (or an external spring) forces cylinder 46 to retract. Upon shifting valve 58 from its shown position, valve 58 connects the discharge of pump 56 to the cylinder ends of cylinders 44 and 46 and connects the rod end 60 of cylinder 44 to reservoir 52, which forces cylinders 44 and 46 to extend. Either the extension or retraction of cylinders 44 and 46 could move their dock member in either direction depending on how the cylinders are coupled to their respective dock members.

As cylinders 44 and 46 extend and retract, hydraulic fluid 54 is withdrawn from or returned to reservoir 52, thereby causing the fluid in reservoir 52 to rise and fall. To accommodate this repeated change in fluid level, reservoir 52 defines an air passageway 72, such as that provided by a breather cap 74. Air passageway 72 allows air to leave reservoir 52 as the fluid level in reservoir 52 rises and allow air to enter the reservoir when the fluid level drops. Arrows 76 depict the flow of air between an interior 78 and an exterior 80 of reservoir 52.

To prolong the life of hydraulic fluid 54 (biodegradable or non-biodegradable), a conventional desiccant 82 (i.e., any moisture absorbing substance) is disposed within breather cap 74 or otherwise disposed in fluid communication with air passageway 72. Desiccant 82 helps remove moisture from the air entering reservoir 52, thus preventing that moisture from diluting or otherwise diminishing the quality of fluid 54. Desiccant 82 can be periodically changed, or a heater 84 can be controlled to periodically "recharge" or dry the desiccant.

In some embodiments, fluid 54 is biodegradable. The term "biodegradable" used herein refers to a fluid, or a constituent thereof that is subject to chemical breakdown or transformation caused by organisms or their enzymes and converted into carbon dioxide, methane, water, inorganic compounds and/or new microbial cellular constituents. There are a variety of tests for determining whether a fluid is biodegradable, such as those mentioned in or referred to in ASTM D6006.

For purposes of use of a biodegradable fluid for a loading dock system, a preferred acceptable level of biodegradability is that the fluid be comprised of at least 75% by mass of biodegradable components. Accordingly as used herein, the terms "acceptably biodegradable" shall refer to a fluid meeting the 75% by mass biodegradability preference.

While biodegradable hydraulic fluids have been known to be used previously for loading dock systems (such as food grade vegetable oils), such biodegradable fluids did not have other material properties that made them viable for the environment of use and application requirements of loading dock systems. As an example, such fluids did not have adequate properties for use in the low temperatures to which dock levelers can be exposed.

Accordingly, a currently preferred biodegradable fluid is a blend of synthetic ester and polyalphaoelfins, which is not only acceptably biodegradable, but has also been found to overcome the shortcomings of previously-used biodegradable fluids by having a desirable combination of properties that make the fluid suitable for use in loading dock systems. More specifically, the fluid has a pour point of about −80° F. (preferably less than −50° F.) as determined by a standard test method specified in ASTM D97. The low pour point, or the temperature at which the fluid begins to gel or solidify, makes the liquid sufficiently fluid to pump even at very low outdoor temperatures of −40° F. The biodegradable fluid also has a viscosity of about 15 cSt at 100° F. (preferably less than 30 cSt at 100° F.), which makes the fluid particularly suitable for use with conventional hydraulic components such as pumps, valves and cylinders. The fluid also has a viscosity index of about 123 (or preferably at least 100), thus the fluid can maintain a desirable viscosity over a broad range of temperatures, which is an important property for a hydraulic fluid that is exposed to a broad range of outdoor temperatures. A fluid's viscosity index can be determined based on ASTM D2270.

Other acceptably biodegradable fluids that may be suitable for use in hydraulic loading dock systems include, but are not limited to, 1) a blend of synthetic ester and a group-II hydrocracked isodewaxed mineral oil, and 2) a substantially hydrolytically stable diester synthetic based fluid.

To prolong the life of the hydraulic fluid (biodegradable or non-biodegradable), hydraulic system 50 includes a pliable or otherwise expanda reservoir (e.g., a pliable bladder) 86 with an optional protective outer housing 88. The expandable reservoir 86 helps hermetically seal system 50 to minimize the fluid's exposure to outside moisture from the surrounding air. The reservoir's expandability and a space 90 between reservoir 86 and housing 88 allow the fluid level in reservoir 86 to rise and lower as cylinders 44 and 46 extend and retract. Space 90 can also serve as a clean air buffer for the rod end of cylinder 46. A breather cap 92 can help maintain the pressure of space 90, and thus the pressure inside expandable reservoir 86, at generally atmospheric pressure. To replenish or change the hydraulic fluid, system 50 preferably includes a hermetically sealed fill cap 94 and a drain plug 96 that are coupled to expandable reservoir 86.

Although the invention is described with reference to a preferred embodiment, it should be appreciated by those of ordinary skill in the art that various modifications are well within the scope of the invention. Dashed line 98 of FIGS. 1-3, for instance, represents a general location at which reservoirs 52 or 88 could be installed. However, the reservoirs could be installed at other locations. Therefore, the scope of the invention is to be determined by reference to the following claims:

The invention claimed is:

1. A loading dock system for engaging a vehicle at a loading dock, comprising:
   a dock member for selectively engaging the vehicle at the loading dock;
   a hydraulic actuator for moving the dock member relative to the vehicle;
   a reservoir that defines an air passageway that places an interior of the reservoir in fluid communication with an exterior of the reservoir;
   hydraulic fluid disposed within the reservoir;
   a pump for conveying the hydraulic fluid between the hydraulic actuator and the reservoir, wherein the hydraulic fluid is acceptably biodegradable and that has material properties that make it suitable for use in loading dock systems;
   a desiccant disposed in fluid communication with the air passageway, whereby the desiccant is able to absorb moisture from air passing between the interior and the exterior of the reservoir; and
   a heater in heat transfer relationship with the desiccant, wherein the heater is periodically energized and de-energized.

2. The loading dock system of claim 1, wherein the hydraulic fluid has a pour point of less than −50°F.

3. The loading dock system of claim 1, wherein the hydraulic fluid has a viscosity of less than 30 cSt at 100° F.

4. The loading dock system of claim 1, wherein the hydraulic fluid has a viscosity index of at least 100.

5. The loading dock system of claim 1, wherein the hydraulic fluid is a blend of synthetic ester and polyalphaoelfins.

6. The loading dock system of claim 1, wherein the hydraulic fluid is a substantially hydrolytically stable diester synthetic based fluid.

7. The loading dock system of claim 1, wherein the hydraulic fluid is a blend of synthetic ester and a group-II hydrocracked isodewaxed mineral oil.

8. The loading dock system of claim 1, wherein the dock member is part of a dock leveler.

9. The loading dock system of claim 1, wherein the dock member is part of a vehicle restraint.

* * * * *